Oct. 13, 1942.  H. W. POUND ET AL  2,298,510
ELECTROSTATIC PRECIPITATING PLATE
Original Filed April 13, 1939.  2 Sheets-Sheet 1

HOWARD W. POUND
MERLE K. RUSH
INVENTORS
by Arthur J. Robert
ATTORNEY

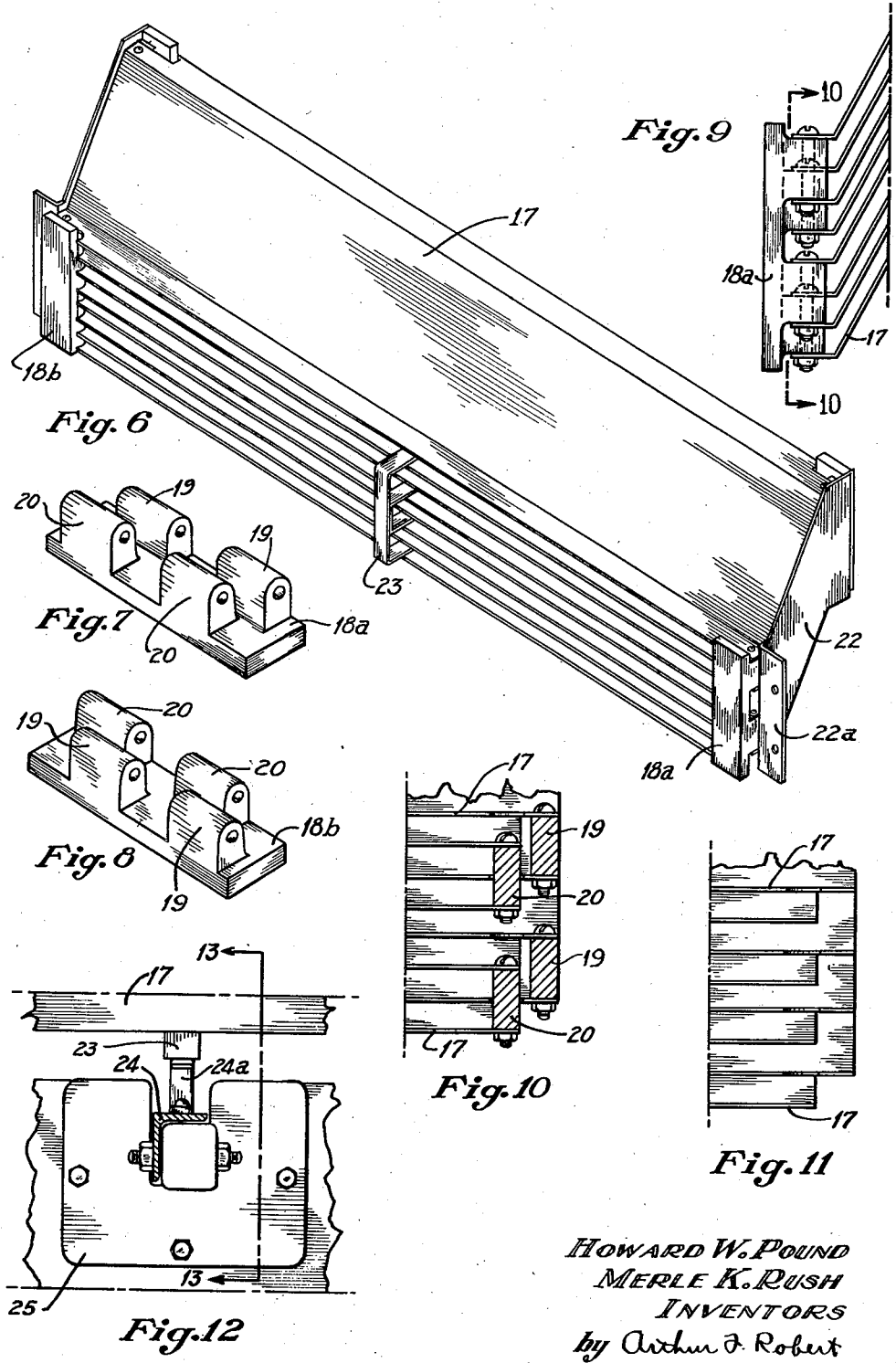

UNITED STATES PATENT OFFICE 2,298,510

ELECTROSTATIC PRECIPITATING PLATE

Howard W. Pound and Merle K. Rush, Louisville, Ky., assignors to American Air Filter Company, Inc., Louisville, Ky., a corporation of Delaware Original application April 13, 1939, Serial No. 267,562. Divided and this application January 12, 1940, Serial No. 313,586

7 Claims. (Cl. 183—7)

Our copending application, Serial No. 267,562, filed April 13, 1939, which issued Aug. 27, 1940 as Patent #2,212,885, describes and claims a Self-cleaning electric gas cleaner, wherein a series of electrical precipitating plates are mounted on a conveyor for movement successively through an oil bath, in which they are cleaned and coated with oil, and a pass area, in which they are electrically charged to precipitate gas borne particles having electrical charges previously imparted to them in an ionizing chamber. This application which, is a division of our aforesaid application, is directed to the structure and arrangement of said plates.

The principal object of the invention is to provide a novel electrostatic precipitating plate arrangement in which objectionable electrical discharges between adjacent plates are minimized.

Another important object is to incorporate groups of such plates in a novel form of cell which can be easily, quickly and inexpensively manufactured and readily secured in assembled relation to form a movable filter medium.

The invention is illustrated in the accompanying drawings as applied to the self-cleaning electrical gas cleaner disclosed in our aforesaid copending application. In said drawings:

Figure 6 is a perspective of a filter cell;

Figure 7 is a perspective in the insulator molding for two diagonally opposite corners of the cell;

Figure 8 is a similar view of the molding for the other two corners of the cell;

Figure 9 is an end elevation of one part of the cell with the end plate removed;

Figure 10 is a section through line 10—10 of Figure 9;

Figure 11 is a section corresponding to Figure 10 but with the molding members removed.

Figure 12 is a fragmentary section taken through line 12—12 of Figure 1; and

Figure 1:
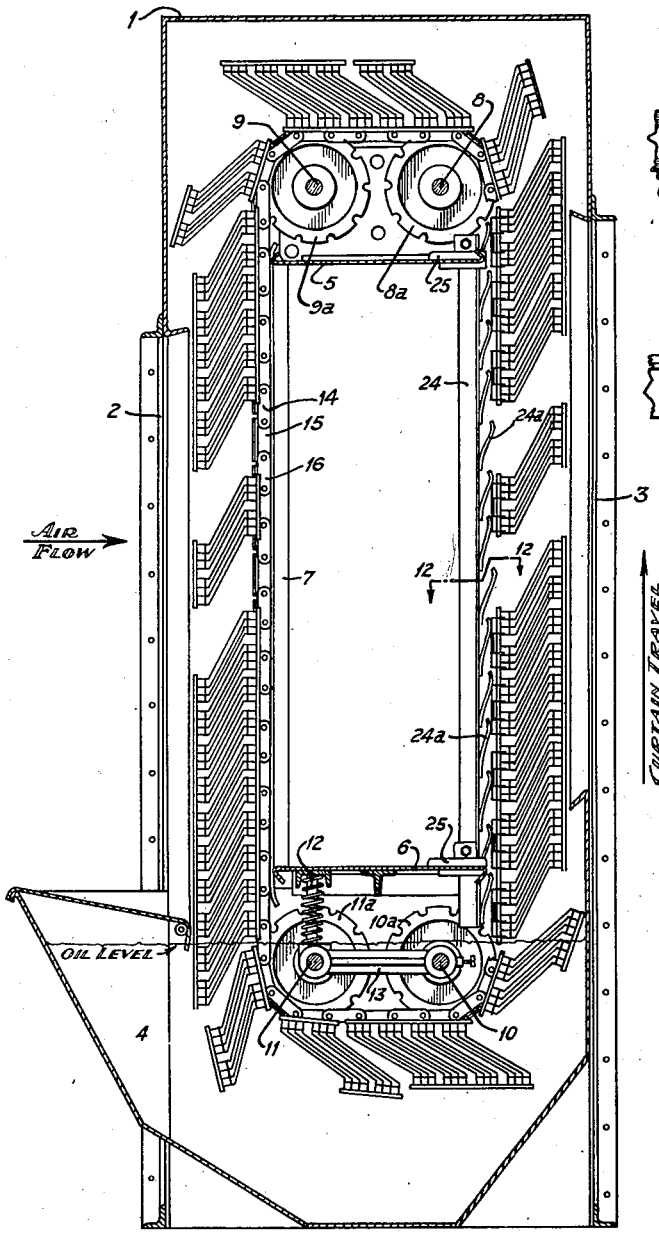
Figure 1 is a vertical sectional view taken centrally through a two-pass structure, two spaced cells in each pass, the conveyor chain adjacent the downstream pass, and the ionizing means in the ionizing chamber between passes, all being omitted for the sake of clearness.

The filter illustrated comprises: a housing, preferably composed of sheet metal; an upright conveyor, having upstream and downstream sections adjacent upstream and downstream areas, mounted within the housing; and a filter medium mounted on the conveyor. The housing or casing 1 is of conventional form having a front inlet opening 2 adjacent the upstream pass area, a rear outlet opening 3 adjacent the downstream pass area, a bottom oil bath 4, and, between pass areas above the bath, a centrally arranged ionizing chamber defined by the vertical side walls of the housing in cooperation with horizontally arranged top and bottom metal partitions 5 and 6. An angle iron conveyor guide 7 is vertically arranged along opposite margins of each pass area, each conveyor guide being rigidly secured to the adjacent vertical side wall of the housing. The upper and lower ends of each guide may be curved slightly to conform to the conveyor path.

The upright conveyor includes suitable shafts, sprockets, and sprocket chains. The shafts comprise a pair of horizontally spaced transversely arranged upper shafts 8 and 9 positioned above the top partition 5 and a similarly arranged pair of lower shafts 10 and 11 positioned below the bottom partition 6. The upper shafts 8 and 9 and the lower shaft 10 are all rotatably mounted on suitable bearings (not shown) which are rigidly secured to the housing 1. The other lower shaft 11 is a floating shaft. It is resiliently urged downwardly by one or more springs 12 suitably mounted between the shaft 11 and the bottom partition 6. The proper spacing between lower shafts 10 and 11 is maintained by a radius rod 13 which extends from one shaft to the other and is pivotally mounted on both. Each shaft carries a pair of laterally spaced sprockets, one adjacent each side of the housing. The sprockets of each pair are designated by the corresponding shaft numeral followed by the letter "a"; viz 8a, 9a, 10a and 11a. The sprockets conventionally cooperate to carry a pair of sprocket chains 14, each sprocket being suitably notched to engage the corresponding chain.

Figure 2:
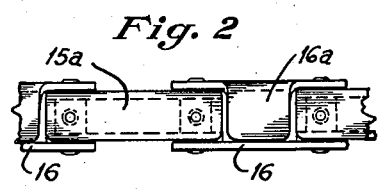
Figures 2 and 3 are top plan and side elevational views of corresponding link portions of a conveyor chain.
Figure 3:
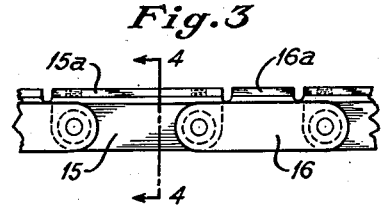
Figure 4:
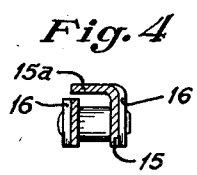
Figure 4 is a section through line 4—4 of Figure 3.
Figure 13:
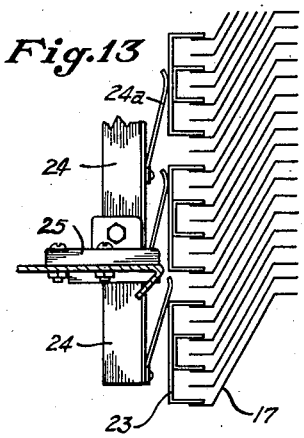
Figure 13 is a fragmentary section along line 13—13 of Figure 12.

The conveyor chains 14 extend along opposite sides of the housing and over the outer faces of the adjacent conveyor guides 7. Each chain is composed of an endless succession of alternate links and another series of intermediate links pivotally secured to each other. The structure and arrangement of each link is illustrated in Figures 2–4 inclusive. As illustrated, each alternate link includes a pair of laterally spaced straps 15, and each intermediate link, a similar pair of straps 16. The outer edge of one strap in each link is extended or flanged outwardly thence laterally over the chain proper to form a securing lug 15a on alternate links and a lug 16a on intermediate links. The lugs 15a may be tapped or otherwise provided with a threaded opening to receive the securing means for the filter medium. The intermediate or connecting links are made wider than alternate links and are telescopically fitted over and pivotally secured thereto.

The filter medium is composed of a succession of electrically separate, narrowly spaced plates 17 which cooperate to define along and across the medium a plurality of narrow gas passages extending through the medium. In this succession of plates, the alternate plates form one series and the intermediate plates another. While straight flat plates could be used, the use of bent plates is preferred in order to secure a gas passage between plates of desired gas-flow depth and yet, at the same time, minimize the overall thickness of the filter medium and thereby correspondingly promote compactness in the structure as a whole. Also while the plates may be bent to provide uniform spacing throughout except possibly at the bends, in accordance with our invention, the plates are bent in a fashion such as to increase the spacing between air flow (i. e. inlet and outlet) face edges of adjacent plates over the smallest spacing which obtains between their precipitating surfaces. The increased spacing is provided to minimize the possibility of objectionable electrical discharges between adjacent plates, the tendency of such discharges to occur being more pronounced at the edges of the plate than along their intermediate surfaces.

Figure 5:
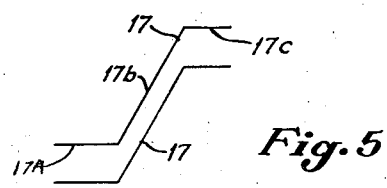
Figure 5 is a schematic view showing the relation between two adjacent plates.

Accordingly (see Figure 5), each plate 17 is provided with a modified zigzag shape so as to present spaced flat air flow edge sections 17a and 17c and one or more flat intermediate precipitating sections 17b, only one being shown, extending at an angle to the edge sections. The size of the smaller angle formed between edge and intermediate sections will, of course, depend upon the spacing desired, between intermediate sections, for a given spacing between air flow edge sections. In any event, such angle will be larger than 100° and smaller than 150°, an angle of 120° being shown.

In further accordance with our invention, the possibility of objectionable electrical discharges occurring between plates is additionally minimized by making the alternate plates longer than the intermediate plates so as to increase the spacing between their end edges.

The plates may be separately mounted on the conveyor chains but preferably are rigidly mounted in groups, of say eight plates, to form filter cells, the cells as a whole being mounted on the chains. The structure of each cell is illustrated in Figures 6–11 inclusive.

As indicated, each cell includes four alternate and four intermediate plates, or two pairs of each. To secure these plates together as a unit, to maintain the proper spacing between them, and, for electrical precipitation purposes, to insulate the intermediate from the alternate plates, four insulator moldings 18 are provided, one traversing the air-flow edges of successive plates along each end margin of each air-flow face of the cell. Two of the moldings which are designated 18a and intended for application to two diagonally opposite corners of the cell, are of the character shown in Figure 7, while the other two moldings, which are designated 18b and intended for application to the other two diagonally opposite corners, are of the character shown in Figure 8.

Each of the moldings 18a is integrally provided with two spacer blocks 19, along its right edge, one for each pair of alternate plates, and with two spacer blocks 20, along its left edge, one for each pair of intermediate plates, the left blocks 20 being offset both laterally and longitudinally from the right blocks 19. Each block projects into, and traverses the space between, the corresponding pair of plates. Each pair of plates is mechanically secured to the interposed spacer blocks, and preferably electrically connected to each other, by means of a bolt passing from one plate to the other through the intervening block. Each spacer block 19 for the alternate plates extends into the space between the adjacent shorter intermediate plates and the end of the cell as a whole. However, to accommodate the spacer blocks 20 of the intermediate plates, the interposed alternate plates are suitably notched.

The structure and arrangement of the moldings 18b are identical to that of the moldings 18a except that the spacer blocks 19 are placed at the left edge of the molding and the blocks 20 at the right edge thereof.

While the cells may be mounted on the conveyor in any suitable way, each cell, preferably, is mounted upon the corresponding links of the conveyor by providing each of its ends with an end plate 22 having a securing flange 22a which is secured to the securing lug 15a on the corresponding link. Each end plate 22 preferably is mechanically secured to the longer alternate plates of the cell, by welds or otherwise, and, to the securing lugs 15a by bolts or otherwise. In each case, the securing means, preferably, electrically connects the parts. In this way, the alternate plates are electrically connected to each other and to the conveyor chain, which may be and, preferably, is grounded. While the individual plates of each intermediate pair may be electrically connected to each other through the spacer-block bolts, all of them, preferably, are electrically connected together, as a unit, by crossover straps 23 which project centrally from the intermediate plates, through that air-flow face of the cell which lies adjacent the conveyor, the straps forming a common collector bar. With this arrangement, the precipitator plates may be electrically charged by impressing suitable voltage, say 5,000 to 6,000 volts, between ground and the collector bars of each cell.

In the arrangement shown, a precipitating voltage need be maintained only across such plates as are in the air-cleaning section of the downstream pass. To connect the intermediate plates in that section to the high side of the precipitator-voltage supply line, a bus bar 24 is vertically mounted on the casing to extend centrally in front of the downstream pass. The bus bar 24 is secured at its upper and lower ends to insulators 25 which are mounted on the top and bottom partitions 5 and 6 of the ionizing chamber. The bar carries a series of spring metal brushes 24a positioned to have sliding contact with the collector bars 23 of the cell.

In operation, the conveyor, and the gas being cleaned, move in the directions indicated in the drawings. The gas is mechanically cleaned as it passes between plates in the upstream pass. Between passes, smoke and other particles remaining in the gas, are electrically charged by some suitable ionizer, not shown. In the downstream pass, the charged particles are electrically precipitated on the plates as a result of the precipitating voltage applied to such plates. In this connection, it may be noted that, at the bottom of the conveyor, the cells hang downwardly into the oil in more or less separated relation. As they emerge from the bath, they swing back into proper filtering relation, and, in this relation, pass upwardly into and through the downstream pass. As they approach such pass, they are electrically connected to the precipitating voltage supply line through the engagement of the bus-bar brushes 24a with the collector bars 23 of the cells. The brushes are so spaced that contact is maintained with the collector bars 23 at all times during their travel through the air-cleaning section of the downstream pass. Consequently, the plates in such section are electrically conditioned, at all times, to precipitate charged particles borne in the air passing between them. Any particles once precipitated in the downstream pass will be firmly bound to the precipitator plates by the fresh coating of oil which the plates received during their passage through the bath and, therefore, ultimately carried into the bath and there removed in the usual way.

Having described our invention, we claim:

1. An electrical gas cleaning precipitating cell, comprising: a group of narrowly spaced plates presenting end face edges and front and rear air-flow face edges; an insulator molding arranged, adjacent each end of each air-flow face, to traverse the edges of successive plates, said molding having spacer blocks, extending into the space between and bearing on spaced plates to space and insulate them; and means for holding said moldings in position.

2. An electrical gas cleaning precipitating cell, comprising: a group of narrowly spaced plates presenting end face edges and front and rear air-flow face edges; and means for securing the plates together as a unit, said means including end plates secured to the ends of alternate plates; and insulator moldings connecting the intermediate plates to alternate plates to space and insulate them.

3. A self-cleaning electrical gas cleaner comprising: a succession of electrical precipitating cells, each cell being composed of a series of alternate plates, a series of intermediate plates, and insulator means connecting the alternate plates to and spacing them from the intermediate plates; a felt-like conveyor movable through cell-cleaning and gas-cleaning areas; means for mounting said cells on said conveyor; and means for moving the conveyor.

4. An improvement in electrical gas-cleaning precipitating cells of the character having a series of plates assembled and supported in narrowly spaced relation with their front and rear edges and their opposite end edges respectively forming front and rear gas-flow faces and opposite end faces, said plates defining narrow gas-flow passages extending from one gas-flow face to the other wherein: each plate is bent to provide substantially parallel front and rear edge sections and an intermediate precipitating section extending at such angle to the edge sections as to produce a spacing between the corresponding front and rear edges of adjacent plates substantially greater than the spacing between the precipitating surfaces thereof, while the alternate plates are made sufficiently longer from end to end than the intermediate plates as to produce a similar relation in the spacing between the corresponding end edges of adjacent plates and the precipitating surfaces thereof.

5. The improvement defined in claim 4 wherein: the end faces are covered by end plates secured to the alternate plates.

6. An electrical gas-cleaning precipitating cell comprising: a series of plates assembled in narrowly spaced relation with their front and rear edges and their opposite end edges respectively forming front and rear air-flow faces and opposite end faces, said plates defining narrow gas-flow passages extending from one gas-flow face to the other; insulator moldings traversing the edges of successive plates, said moldings having spacer blocks projecting into the space between and bearing upon spaced plates to space and insulate them; and means for holding said moldings in position.

7. An electrical gas-cleaning precipitating cell comprising: a series of plates assembled in narrowly spaced relation with their front and rear edges and their opposite end edges respectively forming front and rear air-flow faces and opposite end faces, said plates defining narrow gas-flow passages extending from one gas-flow face to the other; an insulator molding arranged, adjacent each end margin of each air-flow face, to traverse the edges of successive plates, said molding having alternate-plate and intermediate-plate spacer blocks respectively extending into the space between and bearing on pairs of spaced alternate plates and intermediate plates to space and insulate them; and means for rigidly securing to each spacer block the plates separated by it.

HOWARD W. POUND.
MERLE K. RUSH.

CERTIFICATE OF CORRECTION.

Patent No. 2,298,510.                                    October 13, 1942.

HOWARD W. POUND, ET AL.

It is hereby certified that error appears in the printed specification of the above numbered patent requiring correction as follows: Page 3, first column, line 57, claim 3, for "felt-like" read --belt-like--; and that the said Letters Patent should be read with this correction therein that the same may conform to the record of the case in the Patent Office.

Signed and sealed this 5th day of January, A. D. 1943.

(Seal)
Henry Van Arsdale,
Acting Commissioner of Patents.